United States Patent
Hefner et al.

(10) Patent No.: US 8,016,915 B2
(45) Date of Patent: Sep. 13, 2011

(54) METHOD AND SYSTEM FOR ULTRASONIC RESIN DEGASSING

(75) Inventors: Rebecca E. Hefner, Greenville, SC (US); Ronald R. Cairo, Greer, SC (US)

(73) Assignee: General Electric Company, Schenetady, NY (US)

( * ) Notice: Subject to any disclaimer, the term of this patent is extended or adjusted under 35 U.S.C. 154(b) by 409 days.

(21) Appl. No.: 12/330,103

(22) Filed: Dec. 8, 2008

(65) Prior Publication Data
US 2010/0139483 A1    Jun. 10, 2010

(51) Int. Cl.
*B01D 19/00* (2006.01)
(52) U.S. Cl. ............ 95/30; 96/175; 422/128; 528/502 R
(58) Field of Classification Search ........ 95/30; 96/175; 422/128; 528/502 R
See application file for complete search history.

(56) References Cited

U.S. PATENT DOCUMENTS

| | | | | |
|---|---|---|---|---|
| 3,229,448 A | * | 1/1966 | Jacke | 96/175 |
| 3,239,998 A | * | 3/1966 | Carter et al. | 96/175 |
| 3,621,892 A | | 11/1971 | Gillespie | |
| 4,049,244 A | | 9/1977 | Hedrich | |
| 4,127,394 A | * | 11/1978 | Verhille | 516/132 |
| 4,391,529 A | | 7/1983 | Hedrich et al. | |
| 4,597,876 A | * | 7/1986 | Hall | 210/748.03 |
| 5,409,523 A | | 4/1995 | Haeuser | |
| 5,591,252 A | | 1/1997 | Haeuser | |
| 5,834,625 A | * | 11/1998 | Kraus et al. | 73/32 R |
| 6,028,166 A | | 2/2000 | Guillot, Jr. | |
| 6,726,743 B2 | * | 4/2004 | Louks et al. | 95/30 |

* cited by examiner

*Primary Examiner* — Duane Smith
*Assistant Examiner* — Douglas Theisen
(74) *Attorney, Agent, or Firm* — James W. Pemrick; Ernest G. Cusick; Frank A. Landgraff

(57) ABSTRACT

A method and system for degassing a resin is provided. A degassing trough retains the resin, and an ultrasonic energy source applies ultrasonic energy to the degassing trough and resin. The application of ultrasonic energy to the resin reduces the amount of trapped gas bubbles contained within the resin.

13 Claims, 1 Drawing Sheet

METHOD AND SYSTEM FOR ULTRASONIC RESIN DEGASSING

BACKGROUND OF THE INVENTION

The present invention relates to a resin degassing and, in particular, to a method and system for using ultrasonic energy to degas resins.

Gas and air bubbles can become trapped in a multi-part resin system as a result of typical mixing processes. The air bubbles are formed from the mixing or "folding" operation required to evenly disperse the multiple parts of the resin system. Use of a resin with entrapped air or gas bubbles in a composite laminate creates a source of defects that can link-up or grow to create local and ultimately global disbonding or delaminating.

Large-scale, continuous fiber reinforced composite components, such as wind turbine blades, or other large composite structures, are typically fabricated by a hand lay-up method. The hand lay-up method typically includes positioning a continuous fiber tape or fabric into a mold and pouring a liquid resin onto the fiber tape or fabric. The blend is then rolled manually to work out any air bubbles and to fully distribute the resin along and within the fiber network. This is followed by a cure process that is typically performed at room temperature for large components. The manipulation of the resin to remove air bubbles and to distribute the resin along and within the fiber network may result in damage to the fibers making up the composite with the consequence being a reduction in strength and stiffness of the component. This method suffers from the drawback that the processing method is labor intensive and suffers from high costs. Alternative methods, such as resin film infusion (RFI), are desirable techniques due to the decreased labor costs related to performing RFI and the reproducible parts that may be achieved. The curing typically takes place at elevated temperatures in an autoclave and the cure is done in a vacuum bag under high pressure (typically 100-200 psi) in order to make the resin flow and remove entrapped air and condensable gases. However, large scale components such as wind turbine blades make autoclave curing cost prohibitive due to the size of autoclave required.

BRIEF SUMMARY OF THE INVENTION

According to one aspect of the present invention, a system for degassing a resin is provided. A degassing trough retains the resin, and an ultrasonic energy source applies ultrasonic energy to the degassing trough and resin. The application of ultrasonic energy to the resin reduces the amount of trapped gas bubbles contained within the resin.

According to another aspect of the present invention, a method for degassing a resin is provided. A first step includes providing a degassing trough for retaining a resin. Another step includes applying an ultrasonic energy source to the degassing trough. The application of ultrasonic energy to the degassing trough reduces the amount of trapped gas bubbles contained within the resin.

According to yet another aspect of the present invention, a system for degassing a powdered mixture is provided. A degassing trough retains the powdered mixture, and an ultrasonic energy source applies ultrasonic energy to the degassing trough and powdered mixture. The application of ultrasonic energy to the powdered mixture reduces the amount of trapped gas bubbles contained within the powdered mixture.

DETAILED DESCRIPTION OF THE INVENTION

The present invention provides a method and system for utilizing ultrasonic energy to reduce or eliminate gas and air bubbles trapped in a multi-part resin system as a result of some known mixing processes. The term "resin" can also include a powder, multiple powders or powdered mixtures. Using a resin with entrapped air or gas bubbles in a composite laminate creates a source of defects that can link-up or grow to create local and ultimately global disbonding or delaminating. According to aspects of the present invention, ultrasonic energy can be used to coalesce distributed bubbles into larger bubbles, which are then easier to evacuate.

One of the problems solved, by aspects of the present invention, is to reduce, mitigate or eliminate the gas and air bubbles trapped in a multi-part resin system as a result of some known mixing processes. This can be accomplished by applying ultrasonic energy to the resin after mixing, or at staged intervals during mixing, such that smaller gas bubbles are caused to vibrate and touch each other to coalesce and become larger bubbles, which then rise more easily to the resin surface. Degassing progress could be monitored by ultrasound instrumentation, which is calibrated against theoretical fluid density with few or no bubbles entrapped. Degassing operations could be ended when sufficient bubbles were evacuated. Drawing a vacuum at the resin surface, which speeds movement of bubbles through the resin to the surface, also facilitates this process.

The remaining resin can be ported to a delivery pipe for application to the composite laminate via any of the traditional methods such as resin transfer molding, vacuum assisted resin transfer molding, wet-bath filament or tow winding, etc.

The method and system of the present invention may be applied in either a batch or continuous process. In all cases, the following factors are optimized for gas bubble formation and rise time to the resin surface within allotted processing times: ultrasonic frequency and amplitude, liquid viscosity (as moderated by temperature and liquid properties), residence time of resin in ultrasonic field, distance bubbles must travel to reach surface and burst, pressure above resin surface, and staging interval energy level and frequency.

Figure 1:
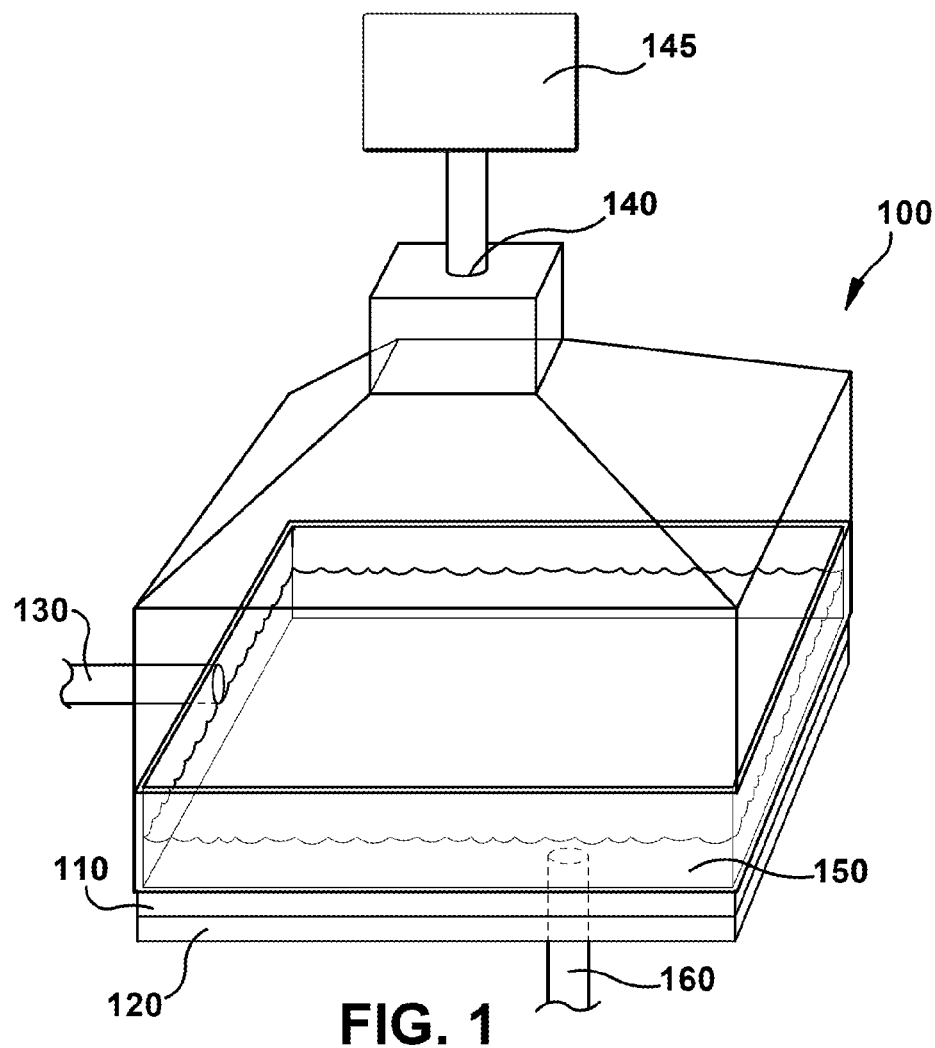
FIG. 1 is a perspective illustration of a degassing system according to one embodiment of the present invention.

FIG. 1 illustrates a perspective view of one embodiment of the present invention. A degassing trough 100 has a high surface area to volume ratio. This helps to reduce or minimize bubble travel distance and increase or maximize the ultrasonic area application with respect to the trough dimensions. Heating and/or cooling coils 110 can be located on the bottom and/or sides of trough 100 to control liquid viscosity.

The ultrasonic energy can be uniformly applied by a variable ultrasonic energy source 120 through the bottom and/or sides of trough 100. Ultrasound or other acoustic emission monitoring instrumentation (not shown) that determines the level of remaining bubbles by comparing to fluid density at a desired bubble state can be employed to determine when sufficient ultrasonic energy has been applied. Alternately, vibratory energy may be input by shaking the trough 100 via direct mechanical means. For example, using a shaker table (not shown) capable of vibrating between about 20 Hz to about 20,000 Hz. Other suitable shaking or vibrating means could also be employed.

The method for a batch process, according to one aspect of the present invention, can include the steps herein described. The desired resin components can be premixed. The mixed resin components can be pumped into the degassing trough via input port 130. The trough 100 has a large surface area to volume ratio dimension, and this helps to ensure a short path of travel for escaping bubbles.

Ultrasonic frequencies are applied evenly through the bottom of the trough via ultrasonic energy source 120, for a period sufficient to out-gas the desired amount of gas bubbles. Concurrently with the ultrasonic energy application, a vacuum may be drawn off the top of the trough via port 140 by vacuum device 145 to encourage bubble migration to the surface. When a monitoring system (not shown) indicates that sufficient degassing has been accomplished, the process can be stopped and resin 150 may be drawn from trough for use via output port 160.

The method for a continuous process, according to one aspect of the present invention, can include the steps herein described. The same degassing principles described above can be used, with the large surface area to volume ratio dimensions and vacuum.

Figure 2:
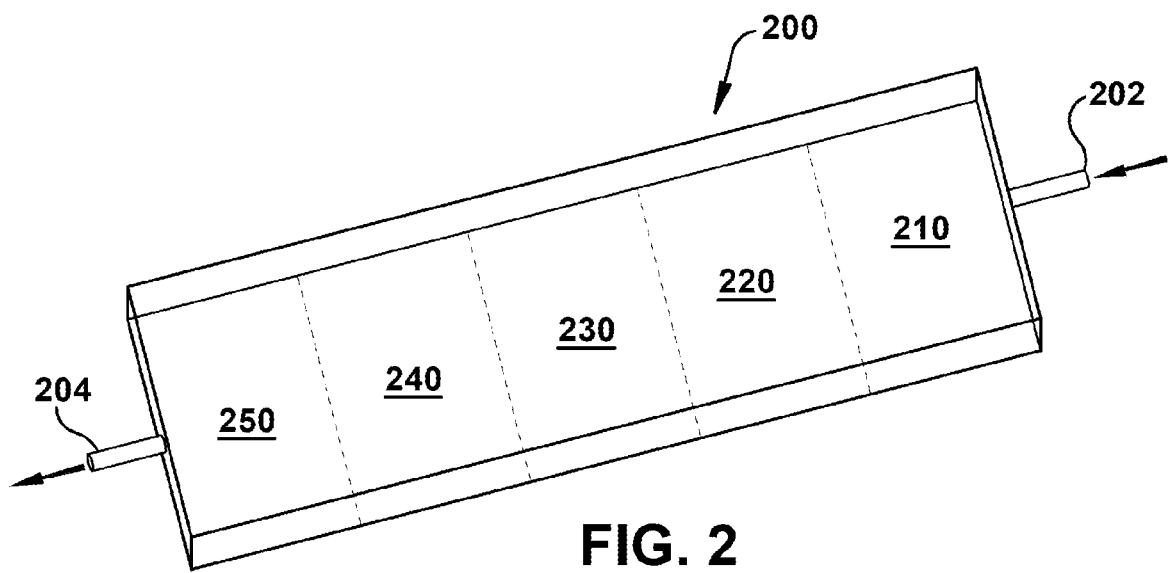
FIG. 2 is a perspective illustration of a degassing system according to another embodiment of the present invention.

FIG. 2 illustrates a perspective view of another embodiment of the present invention. An elongated trough 200 can incorporate a series of staged locks 210, 220, 230, 240, 250 for residence time, where mixed resin components flow from one lock to another in various stages of degassing. Mixed resin components can be entered into the trough via input port 202, and the degassed resin can be drawn out through output port 204. The degassing process can be controlled and monitored at each stage of degassing with suitable control devices (not shown). At the end of the trough at the last lock 250, the degassed resin can be drawn out for use.

In aspects of the present invention the elongated trough 200 can have ultrasonic energy applied through the floor, along a portion of the floor or along the entire length. Each lock or stage can apply the same or different levels of ultrasonic energy and/or heat along the length to optimize energy input for current bubble levels. The degassing progress can be monitored along the length of the trough to ensure optimal process parameters.

Each lock may be separated by a physical door or gate, or may have no physical barriers with the neighboring lock or stage. The locks can be configured to individually apply the same or different levels of ultrasonic energy, heat and/or cooling. A plurality of sensors (not shown) can be disposed at various locations in some or all of the stages to monitor various process parameters, including but not limited to, degassing progress, temperature, flow rate, and any other desired process parameters.

While the invention has been described in connection with what is presently considered to be one of the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for degassing a resin comprising:
   a degassing trough for retaining said resin;
   an ultrasonic energy source for applying ultrasonic energy to said degassing trough and said resin;
   a vacuum source connected to the degassing trough;
   a thermal application device in thermal communication with the degassing trough, the thermal application device configured to heat or cool the resin; and
   wherein, the application of ultrasonic energy to said resin reduces the amount of trapped gas bubbles contained within said resin, and the vacuum source applies a vacuum to the degassing trough to assist in the reduction of the trapped gas bubbles.

2. The system according to claim 1, further comprising:
   at least one monitoring device for monitoring the progress of a degassing operation.

3. The system according to claim 2, wherein said at least one monitoring device monitors at least one of the following parameters:
   temperature, pressure, resin density, and resin viscosity.

4. A method for degassing a resin comprising:
   providing a degassing trough for retaining said resin;
   applying an ultrasonic energy source to said degassing trough;
   applying a vacuum to the degassing trough, the vacuum assisting in the reduction of the trapped gas bubbles in the resin;
   providing a thermal application device in thermal communication with the degassing trough, the thermal application device configured to heat or cool the resin; and
   wherein, the application of ultrasonic energy to said degassing trough reduces the amount of trapped gas bubbles contained within said resin.

5. The method according to claim 4, further comprising:
   providing at least one monitoring device for monitoring the progress of a degassing operation.

6. The method according to claim 5, wherein said at least one monitoring device monitors at least one of the following parameters:
   temperature, pressure, resin density, and resin viscosity.

7. A system for degassing a powdered mixture comprising:
   a degassing trough for retaining said powdered mixture;
   an ultrasonic energy source for applying ultrasonic energy to said degassing trough and said powdered mixture;
   a vacuum source connected to the degassing trough, the vacuum source configured to apply a vacuum to the degassing trough to assist in the reduction of the trapped gas bubbles;
   a thermal application device in thermal communication with the degassing trough, the thermal application device configured to heat or cool the powdered mixture; and
   wherein, the application of ultrasonic energy to said powdered mixture reduces the amount of trapped gas bubbles contained within said powdered mixture.

8. The system according to claim 7, further comprising:
   at least one monitoring device for monitoring the progress of a degassing operation.

9. The system according to claim 8, wherein said at least one monitoring device monitors at least one of the following parameters:
   temperature, pressure, powdered mixture density, and powdered mixture viscosity.

10. A method for degassing a powdered mixture comprising:
    providing a degassing trough for retaining the powdered mixture;
    applying an ultrasonic energy source to the degassing trough;
    applying a vacuum to the degassing trough, the vacuum assisting in the reduction of the trapped gas bubbles in the powdered mixture; and
    wherein, the application of ultrasonic energy to said degassing trough reduces the amount of trapped gas bubbles contained within said powdered mixture.

11. The method according to claim 10, further comprising:
providing a thermal application device in thermal communication with the degassing trough;
wherein the thermal application device is used to heat or cool the powdered mixture.

12. The method according to claim 10, further comprising:
providing at least one monitoring device for monitoring the progress of a degassing operation.

13. The method according to claim 12, wherein the at least one monitoring device monitors at least one of the following parameters:
temperature, pressure, powdered mixture density, and powdered mixture viscosity.

\* \* \* \* \*